United States Patent
Tanaka et al.

(10) Patent No.: US 6,185,086 B1
(45) Date of Patent: Feb. 6, 2001

(54) CAPACITOR

(75) Inventors: Yutaka Tanaka, Imizu-gun; Katsumasa Kaneko, Takaoka; Susumu Matsumoto, Higashitonami-gun, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/203,766

(22) Filed: Dec. 2, 1998

(30) Foreign Application Priority Data

Dec. 4, 1997 (JP) .................................................. 9-333857

(51) Int. Cl.$^7$ ............................... H01G 2/20; H01G 4/06; H01G 4/005
(52) U.S. Cl. ..................... 361/308.1; 361/311; 361/303; 361/301.1
(58) Field of Search ............................. 361/301.1–301.4, 361/302, 303, 306.1, 306.3, 307, 308.1, 308.2, 308.3, 309, 311

(56) References Cited

U.S. PATENT DOCUMENTS

| | | | |
|---|---|---|---|
| 3,431,473 | * 3/1969 | Cormier et al. | 361/301.3 |
| 3,684,927 | * 8/1972 | Correll | 361/518 |
| 3,775,527 | * 11/1973 | Kinney, Jr. et al. | 264/159 |
| 4,656,556 | * 4/1987 | Westermann | 361/307 |
| 4,962,446 | * 10/1990 | Asakura et al. | 361/782 |
| 5,142,436 | * 8/1992 | Lee et al. | 361/302 |
| 5,412,532 | * 5/1995 | Nishimori et al. | 361/306.1 |
| 5,546,058 | * 8/1996 | Azuma et al. | 333/183 |
| 5,850,332 | * 12/1998 | Kunieda et al. | 361/523 |
| 5,944,567 | * 8/1999 | Ratajczak et al. | 439/874 |
| 5,972,139 | * 10/1999 | Chu | 174/DIG. 8 |
| 5,978,203 | * 11/1999 | Kiyomura et al. | 361/301.3 |

\* cited by examiner

*Primary Examiner*—Kristine Kincaid
*Assistant Examiner*—Eric Thomas
(74) *Attorney, Agent, or Firm*—McDermott, Will & Emery (57) ABSTRACT

A capacitor element having a terminal, an electric insulating material installed to cover the capacitor element, a wire connected to the terminal, and a reinforcing structure installed at the junction for connecting the terminal and the wire. In this constitution, the junction of the terminals and wires maintains mechanical strength and electrical insulation and is enhanced in reliability for a long period against mechanical stress or vibration to the capacitor from outside. Still more, invasion of moisture or dust into the capacitor can be prevented. As a result, the life of the excellent mechanical strength and electrical insulation is enhanced, and the capacitor having a stable reliability for a long time may be obtained.

28 Claims, 7 Drawing Sheets

CAPACITOR

TECHNICAL FIELD OF THE INVENTION

The present invention relates to a capacitor used in an electric appliance for the purposes of driving a motor, improving the power factor, charging and discharging, smoothing, and the like.

BACKGROUND OF THE INVENTION

Figure 7:
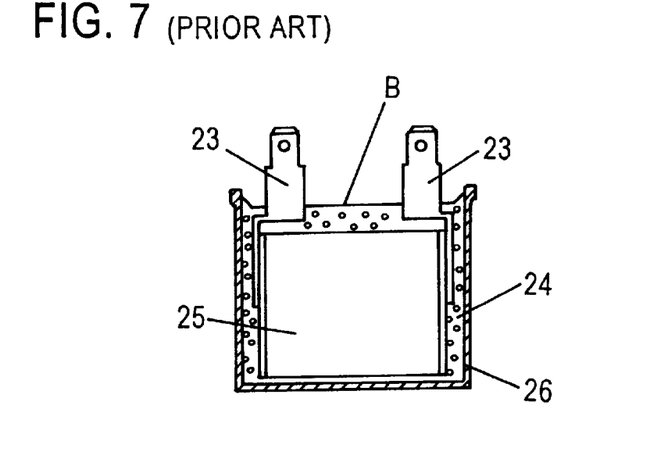
FIG. 7 is a front view including a partial section of a capacitor in a prior art.
Figure 8:
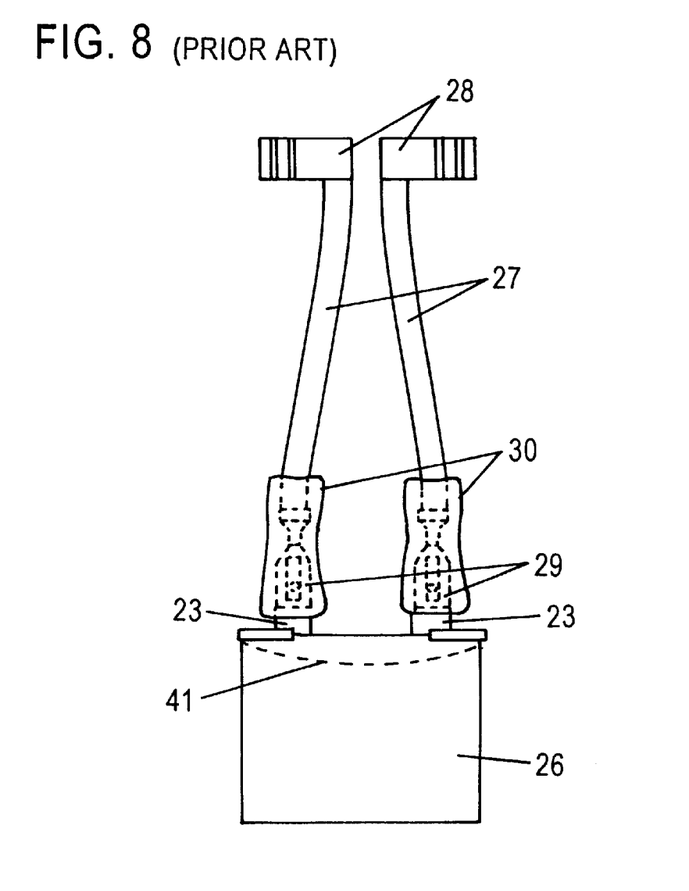
FIG. 8 is a front view including a wire junction of the capacitor in he prior art.

A sectional view of a conventional capacitor is shown in FIG. 7. Hitherto, as shown in FIG. 7, a capacitor element 25 connecting a terminal 23 was put in a resin case 26, and it was filled with an insulating resin 24. An explanatory diagram for installing such capacitor in appliances is given in FIG. 8. In FIG. 8, a terminal 23 is connected to an electronic appliance 28 by using a connector 29 and a wire 27. In this case, a capacitor is often connected to the electronic appliance by soldering or welding, instead of using the connector 29. Also, to insulate and protect the wire junction, a rubber or plastic protective cover 30 was merely fitted to cover the junction.

In such prior art, it was a problem that the mechanical strength of the wire junction was inferior. That is, the crimping portion of the wire 27 and connector 29 was easily folded and bent, and the wire was often broken. Or, if an excessive vibration is applied, the wire may be broken due to its stress. Or, if the wire is connected by welding or soldering, the mechanical strength of the wire junction is much lower. Thus, in the conventional capacitor, there was a high possibility of occurrence of folding of wire junction, excessive mechanical stress, and vibration in the appliance manufacturing process, during transportation, or in actual use. Hence, the wire junction is likely to be broken.

Still more, it is also desired to enhance the electric insulation of the terminal area against moisture and dust, and as shown in FIG. 8, the surface 41 of the insulating resin 24 filling up between the capacitor element 25 and resin case 26 is a concave surface. This is due to the surface tension of the material of the insulating resin being used. When a water drop deposits on the resin surface, the water drop is likely to be collected in this shape. Or, as shown in FIG. 8, the protective cover 30 was place to cover the connecting part merely, and it had no waterproof effect against water drop. These conventional capacitors are inferior in dustproof property, and therefore, when conductive dust deposits on the terminal area, the electric insulation of the terminal may be extremely impaired. Such capacitors are widely used in electric appliances high in possibility of exposure to water such as refrigerator and washing machine. In particular, when the capacitor is installed in an orthostatic state, further improvement from the conventional properties are demanded in the waterproof performance to water in the terminal area and the electric insulation against water and dust as mentioned above.

Figure 9:
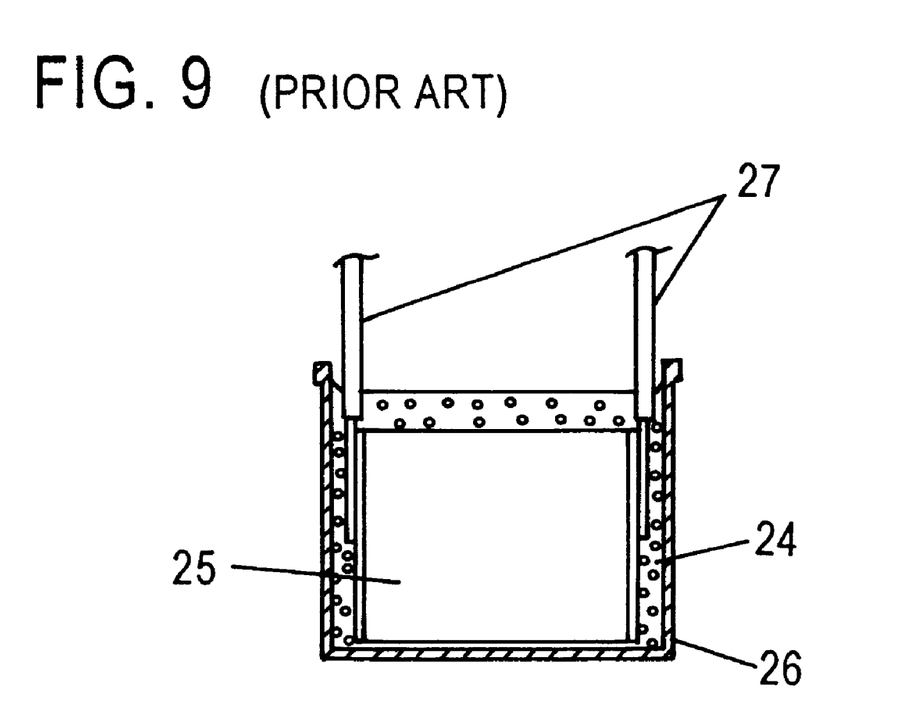
FIG. 9 is a front view including a partial section of a capacitor in other prior art.

Other example of conventional capacitor is shown in FIG. 9. In FIG. 9, a wire 27 is buried in the insulating resin 24. Accordingly, if the wire 27 is bent, it is not folded at the junction. Therefore, the bending strength of the junction is assured, but when used for a long time, the coating of the wire changes in the time course and the coating of the armor deteriorates, and the outside diameter becomes smaller. As a result, a gap is gradually formed between the wire 27 and insulating resin 24, and water or dust may invade through such gap. As a result, the function of the capacitor may be lost.

SUMMARY OF THE INVENTION

The capacitor of the invention enhanced in mechanical strength and electric insulation comprises a capacitor element having a terminal, an electric insulating material disposed to cover the capacitor element, a wire connected to the terminal, and reinforcing means disposed at the junction for connecting the terminal and the wire.

In this constitution, against mechanical stress or vibration to the capacitor from the outside, the mechanical strength and electric insulation at the junction of the terminal and wire are stably maintained, and the long-term reliability is enhanced. Moreover, invasion of moisture or dust into the capacitor is prevented, and the mechanical strength and the life of electric insulation are enhanced, so that the capacitor having a stable reliability for a long period is obtained.

DETAILED DESCRIPTION OF THE INVENTION

A capacitor in an embodiment of the invention enhanced in mechanical strength and electric insulation comprises a case having an opening, a capacitor element disposed in the case having a terminal, an electric insulating resin disposed in the opening of the case to cover the capacitor element, a wire connected to the terminal, and reinforcing means disposed at the junction for connecting the terminal and the wire.

Preferably, the reinforcing means has an insulating cover installed to cover the junction and the surface of the electric insulating resin.

Preferably, the insulating cover has a hole, and the wire penetrates through the hole.

Preferably, the reinforcing means has a heat shrink tube installed to cover the junction and the surface of the electric insulating resin.

Preferably, the reinforcing means has an insulating cover installed to cover the junction and the surface of the electric insulating resin, and a filler for filling the gap formed between the insulating cover and the surface of the electric insulating resin.

Preferably, the reinforcing means has a heat shrink tube installed to cover the junction.

Preferably, the reinforcing means has a heat shrink tube installed to cover the junction, and a filler installed on the surface of the electric insulating resin to cover the lower end of the heat shrink tube.

Preferably, the electric insulating resin has a convex filler having an inclination in the case from the center, and the filler is formed so as to remove water depositing on the electric insulating resin outside of the case.

Preferably, the reinforcing means has a heat shrink tube installed to cover the junction, and a filler installed on the surface of the electric insulating resin to cover the lower end of the heat shrink tube, the electric insulating resin has a convex shape having an inclination in the case from the center, and is formed so as to remove water depositing on the electric insulating resin outside of the case.

Preferably, the electric insulating resin has a groove formed in the surface, and the groove is formed so as to be capable of removing water depositing on the electric insulating resin outside of the case.

Preferably, the electric insulating resin has a shape with a concave portion in the center, a groove is formed in the center of the electric insulating resin, the side surface of the case has a hole formed at lower position than the bottom of the concave portion, and the groove is formed continuously from the concave portion toward the hole, whereby water depositing on the electric insulating resin can be removed outside of the case.

Preferably, the filler is at least one material selected from the group consisting of epoxy resin, urethane resin, silicone resin, synthetic rubber, and natural rubber.

Preferred embodiments of the invention are described below while referring to FIG. 1 to FIG. 6.

Exemplary embodiment 1

Figure 1:
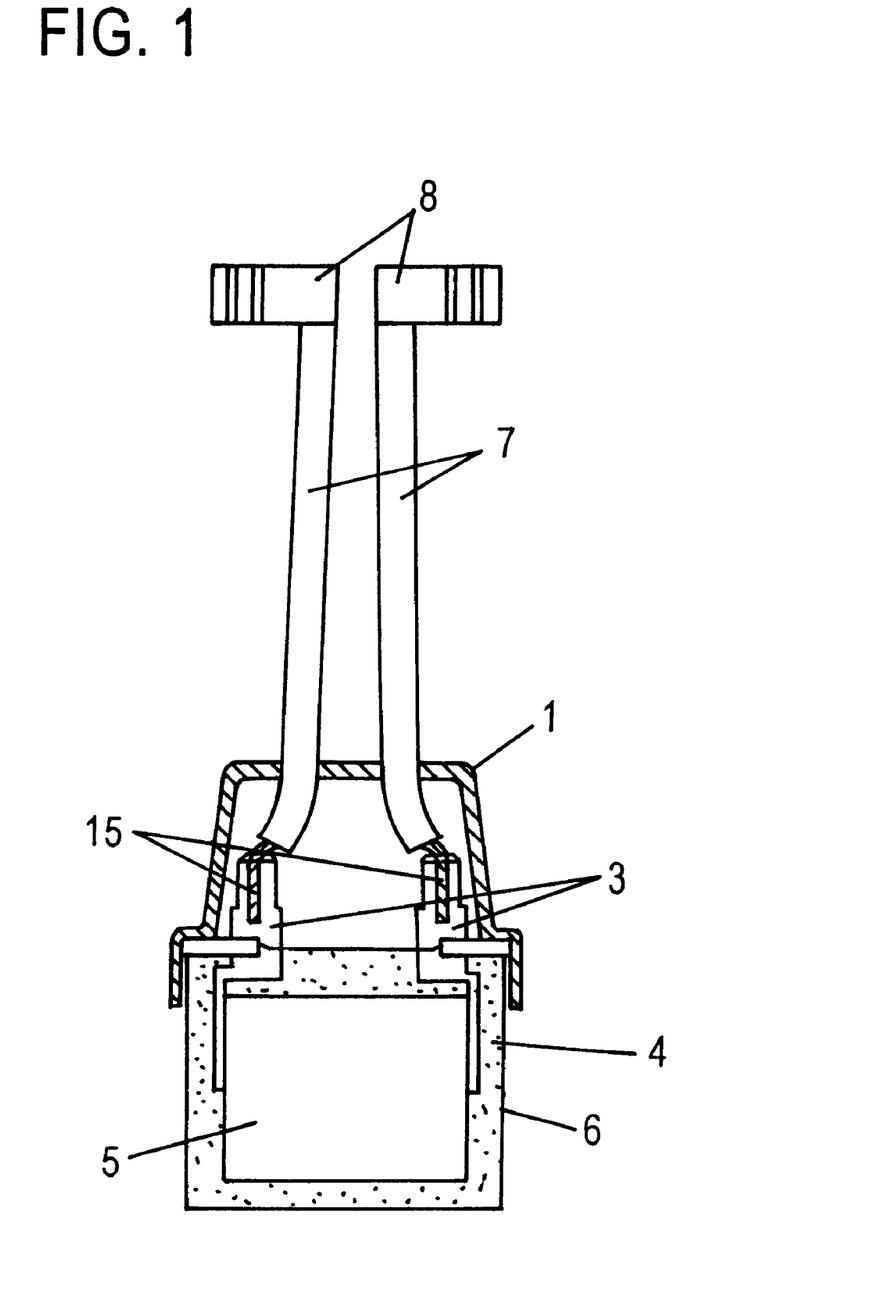
FIG. 1 is a front view including a partial section of a capacitor in embodiment 1 of the invention.

A connection state of a capacitor and an electronic appliance in embodiment 1 of the invention is shown in FIG. 1. In FIG. 1, a capacitor element 5 is installed in a case 6 having an opening, and a pair of terminals 3 are connected to this capacitor element 5. The gap between the case 6 and capacitor element 5 is filled up with an insulating resin 4. The terminals 3 are exposed from the surface of the insulating resin 4. The terminals 3 are connected to an electronic appliance 8 with wires 7. The terminals 3 and wires 7 are connected at a junction 15. An insulating cover 1 is installed in the case 6 to cover the junction 15 and the insulating resin 4. The case 6 is made of a resin. The insulating cover 1 has a role as reinforcing means. The insulating cover 1 protects the wire junction 15 from folding from outside, mechanical stress, and vibration. The upper part of the insulating cover 1 has a through-hole for passing the wires 7. The wall thickness of the insulating cover 1 is about 1 mm. Its thickness is preferred to be 0.8 mm or more in consideration of the strength. By selecting the material for the insulating cover 1, it may be provided with a flame retardant property. As the material for the insulating cover, thermoplastic resins such as polypropylene, polyethylene terephthalate and nylon, and thermosetting resins such as unsaturated polyester and polybutylene terephthalate can be used. The bending strength of the molded piece is preferred to be about 400 kg/cm$^2$ according to ASTM testing method (D790), and more preferably 500 kg/cm$^2$ or more. The thermal deformation temperature is preferred to be 100° C. or more according to ASTM testing method (D648, 4.5 kg/cm$^2$), and more preferably 120° C. or more. As the insulating cover 1, a rubber material may be also used, and, in this case, by selecting the hardness and thickness, the same effects as above may be obtained. Thus, the material for the insulating cover 1 is not particularly limited. Moreover, as the insulating cover 1, case 6, and wires 7, flame retardant materials can be used. For example, when using a synthetic resin, by using a material equivalent to the flame retardant grade V-2, V-1, V-0 of United States Safety Standard UL94, a flame retardant capacity is obtained as the capacitor on the whole, and a capacitor of extremely high safety is obtained. Incidentally, the electronic appliance 8 has flag shaped terminals, and the wires 7 are connected the flag shaped terminals.

In the embodiment, with the insulating cover 1 attached, the through-hole of the insulating cover 1 and the wire 7, and the fitting pact (contact part) of the insulating cover 1 and case 6 are sealed with a sealant such as adhesive, or the gap is eliminated by thermal fusion by ultrasonic wave or the like, so that a complete sealing is obtained by shutting off between the capacitor element and fresh air, and hence a capacitor of high waterproof and dustproof properties may be obtained.

Also with the insulating cover 1 attached, by filling the gap in the insulating cover 1 with thermosetting resin such as epoxy resin or urethane resin, or by a filler such as rubber material, the waterproof and dustproof properties of the capacitor may be further enhanced. As the rubber material, silicone resin, synthetic rubber or natural rubber may be used.

In embodiment 1, the terminals 3 and wires 7 are connected by welding, but this connection is not particularly limited, and it is also possible to connect by soldering or by using a connector, and same effects as above are obtained.

The shape of the insulating cover 1 is not particularly limited, and, for example, the through-hole for passing the wires may be in a two-piece shape so that both ends abut against each other when installing in the capacitor.

Embodiment 1 relates to a case of two terminals having a pair of terminals, but same effects are obtained in the capacitor having three or more terminals.

Exemplary embodiment 2

Figure 2:
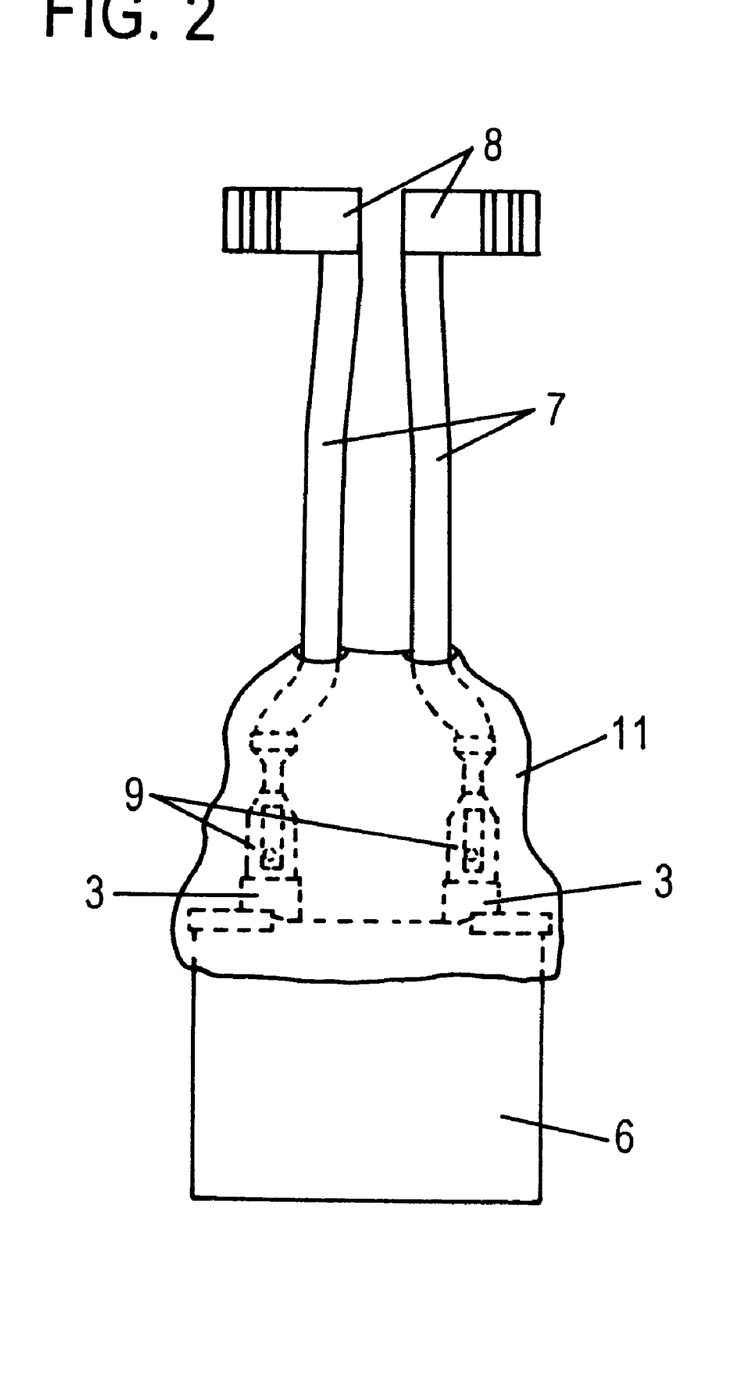
FIG. 2 is a front view of a capacitor in embodiment 2 of the invention.

A connection state of a capacitor and an electronic appliance in embodiment 2 of the invention is shown in FIG. 2. In FIG. 2, as the reinforcing means, a heat shrink tube 11 is used instead of the insulating cover 1 in embodiment 1. Further, terminals 3 and wires 7 are connected by using a connector 9. The heat shrink tube 11 is preferred to be made of a material having a large shrinkage rate, and in embodiment 2, a tube with an inside diameter shrinkage rate of 60% is used. However, as the heat shrink tube 11, it is desired to obtain a sufficient contact with the case 6 and contact with the wires 7, and the shrinkage rate of the tube 11 is selected depending on the structure of the case 6 and others. Preferably, the inner surface of the heat shrink tube 11 has an adhesive, and in this case, after shrinkage of the tube 11, a nearly perfect adhesion is assured, and the effect is further enhanced. After heat shrinkage of the heat shrink tube 11, the wall thickness of the tube is desired to be 0.8 mm or more, and more preferably 1 mm or more. In order to reinforce the bending strength of the wire junction, the hardness of the material of the tube 11 is desired to be high, and preferably 40 degrees or more in order to achieve the object. Further, by filling up the gap in the tube 11 after shrinkage with synthetic resin or rubber material, the waterproof and dustproof effects of the capacitor may be further enhanced.

Exemplary embodiment 3

Figure 3:
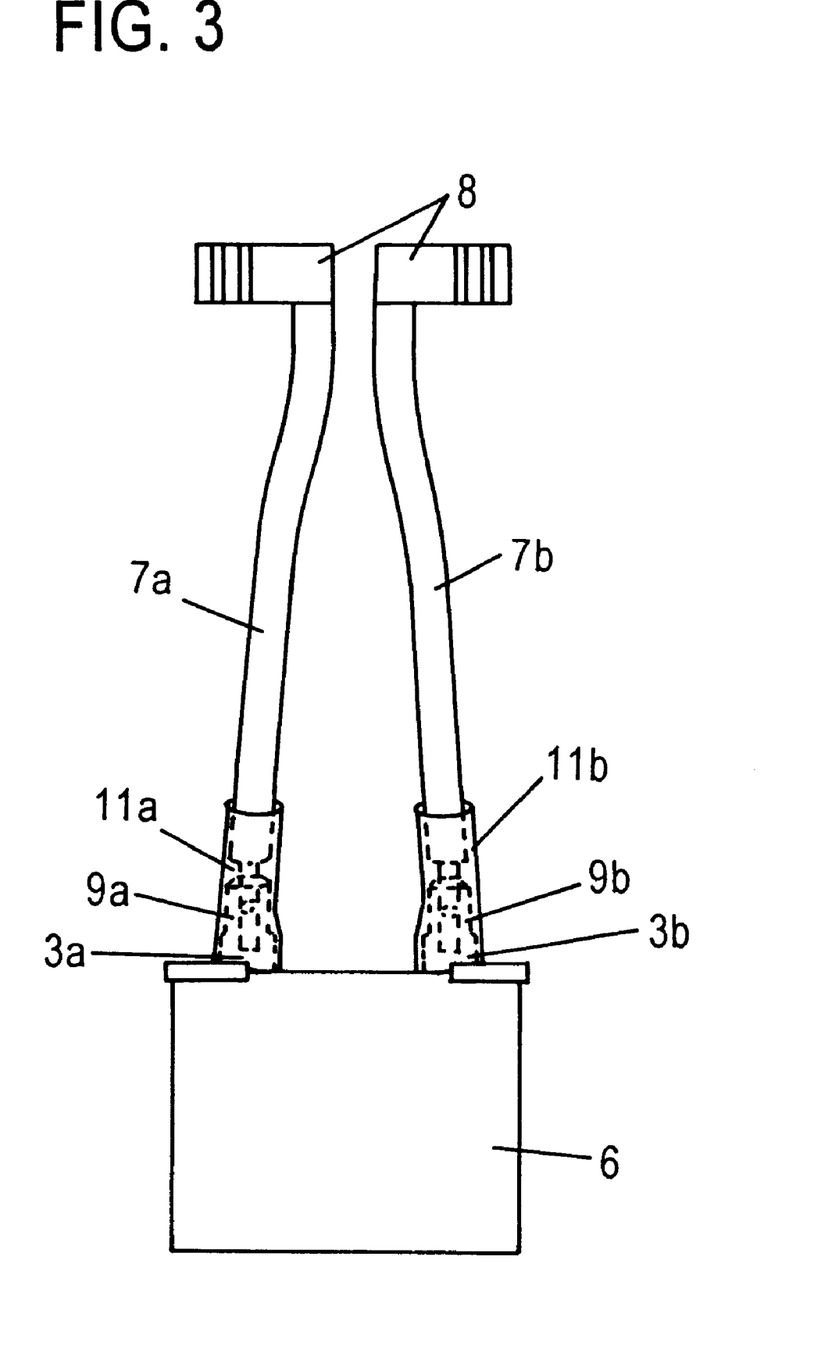
FIG. 3 is a front view of a capacitor in embodiment 3 of the invention.
Figure 4:
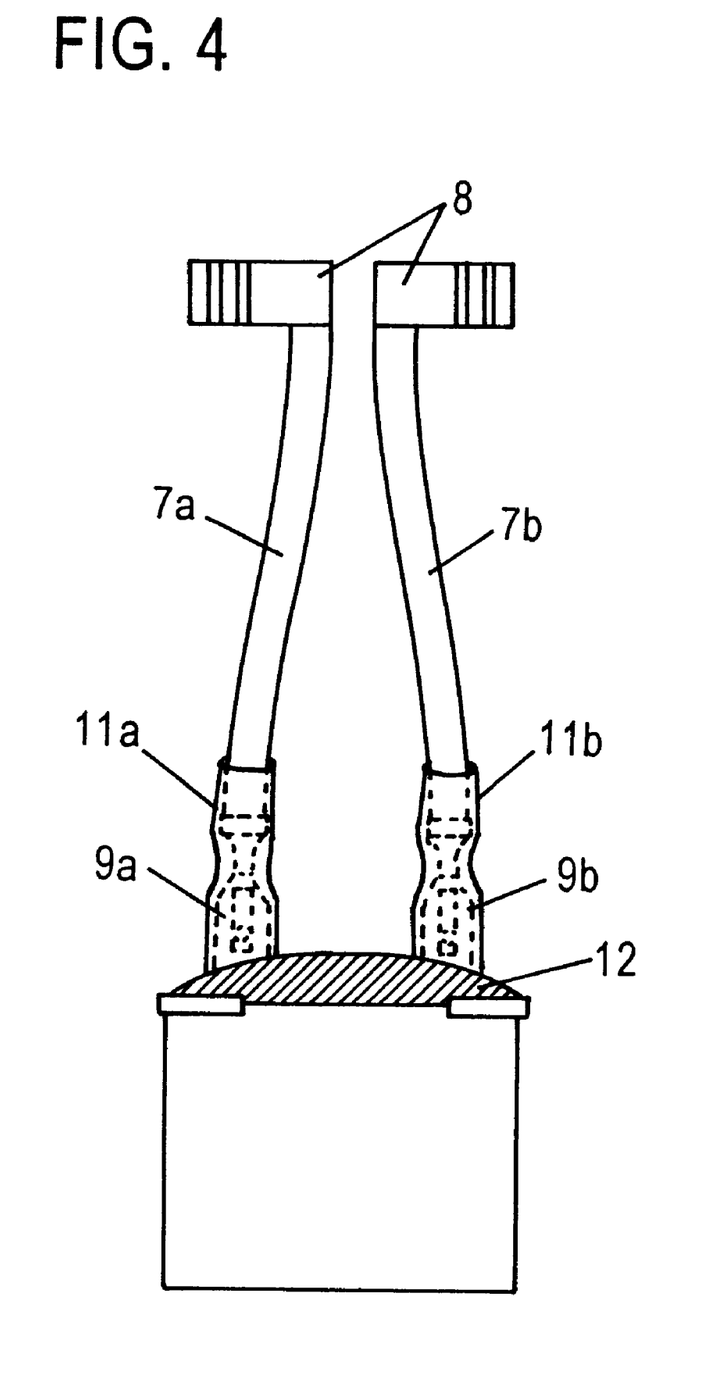
FIG. 4 is a front view showing a modified example of embodiment 3 of the invention.

A connection state of a capacitor and an electronic appliance in embodiment 3 of the invention is shown in FIG. 3 and FIG. 4. In FIG. 3, a heat shrink tube is used as reinforcing means. A terminal 3 is composed of a first terminal 3a and a second terminal 3b. The first terminal 3a is connected to a first wire 7a by means of a first connector 9a. The second terminal 3b is connected to a second wire 7b by means of a second connector 9b. To cover the first connector 9a, a first heat shrink tube 11a is installed, and to cover the second connector 9b, a second heat shrink tube 11b is installed. The heat shrinkage rate of this heat shrink tube may be 20% or more.

In FIG. 4, a filler 12 is installed to cover the lower end of the terminals 3a, 3b of the capacitor and the surface of an insulating resin 4. By forming a convex surface in this filler 12 having functions for enhancing the waterproof, dustproof, and drainage properties of the capacitor, the gap in the contact area of the heat shrink tubes 11a, 11b and the upper surface of the capacitor is completely sealed to prevent invasion of moisture or dust, and moreover moisture falling or depositing on the surface of the filler 12 can be easily removed, so that water may not stay around the terminals. Preferably, the effect may be further enhanced by composing so that the entire surface of the capacitor may be positioned at the upper side of the highest end of the case 6 by the surface tension of the liquid material of the filler 12. The material of the filler 12 may be any arbitrary synthetic resin or rubber material, and preferably its material should have a thixotropic property. By using a material having a high thixotropic property, it is easier to form a convex surface.

Exemplary embodiment 4

Figure 5:
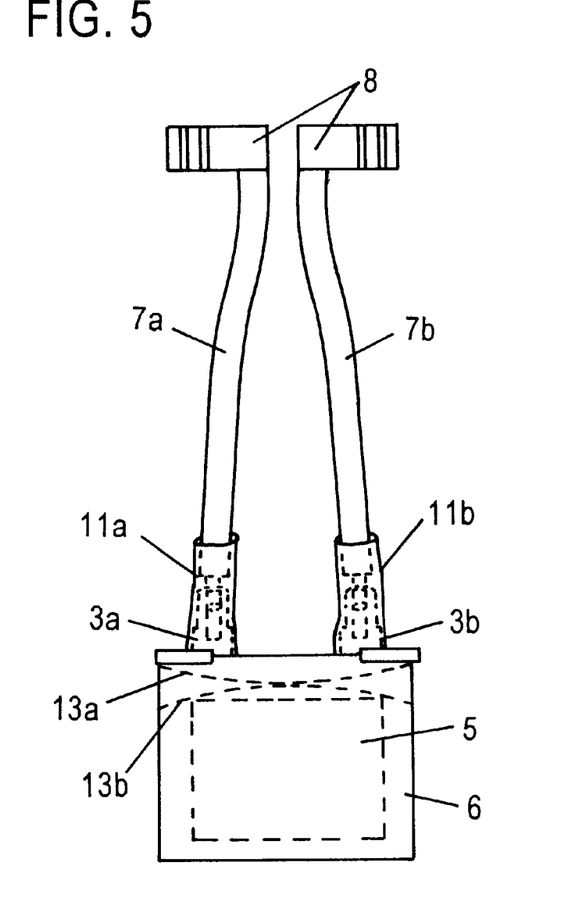
FIG. 5 is a front view of a capacitor in embodiment 4 of the invention.
Figure 6:
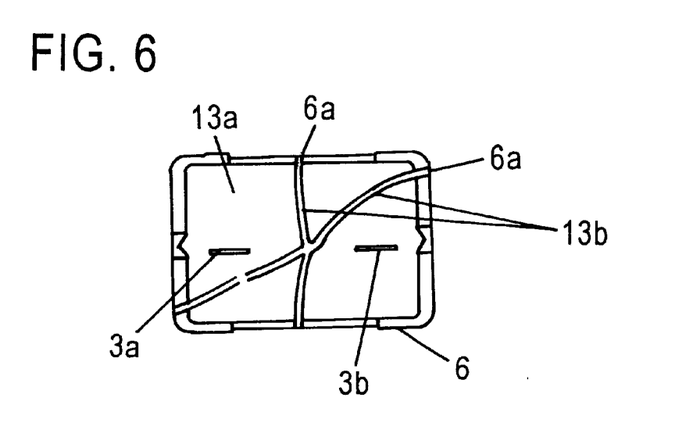
FIG. 6 is a top view of the groove of embodiment 4 of the invention.

A connection state of a capacitor and an electronic appliance in embodiment 4 of the invention is shown in FIG. 5 and FIG. 6. In FIG. 5 and FIG. 6, the connection of the terminals and wires of the capacitor element is same as in embodiment 3 explained in FIG. 3. In FIG. 5 and FIG. 6, to cover the surface of the capacitor element 5, the case 6 is filled with an insulating resin 13. The surface 13a of the insulating resin 13 is concave. A groove 13b is formed in this surface 13a. The case 6 has a side hole 6a. The groove 13b is formed toward the hole 6a of the case 6, to a further lower position from the lowest position of the surface 13a. The shape, dimension, and number of the grooves 13b may be set according to the circumstances, and are not particularly limited. The forming method of the groove 13b may be realized by various methods, including cutting method in a later process, and a forming method when curing the resin. The groove 13b may be also formed in the capacitor in embodiment 3. In this constitution, water depositing on the surface of the terminals or the capacitor may be removed through the groove 13b. As a result, the capacitor having high electric insulation and long-term reliability may be obtained.

Thus, according to the invention, by using reinforcing means such as insulating cover and heat shrink tube at the junction of the terminals and wires of the capacitor, the junction of the terminals and wires maintains mechanical and electrical strength for a long period against mechanical stress or vibration to the capacitor from outside, and invasion of moisture or dust from outside can be prevented, or water discharge can be promoted. As a result, the capacitor having high electric insulation and long-term reliability may be obtained.

What is claimed is:

1. A capacitor enhanced in mechanical strength and electric insulation comprising:

a capacitor element having a terminal, an electric insulating material disposed to cover said capacitor element, a wire connected to said terminal, and reinforcing means disposed at a junction for connecting said terminal and said wire, wherein said reinforcing means has a heat shrink tube and an electric insulating resin, said heat shrink tube covers said junction, and said electric insulating resin covers a bottom of said heat shrink tube.

2. The capacitor of claim 1, wherein a surface of said electric insulating resin has a convex shape having an inclination toward an outer surface of said electric insulating material from a center thereof, and said convex shape is formed so as to remove water depositing on said electric insulating resin to outside of said electric insulating material.

3. The capacitor of claim 1, further comprising a case having an opening, wherein said capacitor element and said electric insulating material are disposed in said case.

4. The capacitor of claim 1, wherein said electric insulating resin includes at least one selected from the group consisting of epoxy resin, urethane resin, silicone resin, synthetic rubber, and natural rubber.

5. The capacitor of claim 1, wherein said heat shrink tube has an inside diameter shrinkage rate of about 60% or more.

6. The capacitor of claim 1, wherein said heat shrink tube has a thickness after shrinkage of about 0.8 mm or more.

7. The capacitor of claim 1, wherein said reinforcing means has a function for protecting said junction from at least one selected from the group consisting of folding, mechanical stress and vibration.

8. The capacitor of claim 1, wherein said reinforcing means has a further insulating resin, and said further insulating resin is filled in a gap inside said heat shrink tube.

9. The capacitor of claim 1, wherein said electric insulating resin has a convex-shape surface having an inclination toward an outer side from a center of the convex-shape surface.

10. A capacitor enhanced in mechanical strength and electric insulation comprising:

a case having an opening, a capacitor element disposed in said case having a terminal, an electric insulating resin disposed in said opening of said case to cover said capacitor element, a wire connected to said terminal, and reinforcing means disposed at a junction for connecting said terminal and said wire, wherein said reinforcing means has a heat shrink tube disposed to cover said junction, and a filler disposed on a surface of said electric insulating resin to cover a lower end of said heat shrink tube, a surface of said electric insulating resin has a convex shape having an inclination toward said case from a center of the surface, and the surface is formed so as to remove water depositing on said electric insulating resin outside of said case.

11. A capacitor enhanced in mechanical strength and electric insulation comprising:

a case having an opening, a capacitor element disposed in said case having a terminal, an electric insulating resin disposed in said opening of said case to cover said capacitor element, a wire connected to said terminal, and reinforcing means disposed at a junction for connecting said terminal and said wire, wherein a surface of said electric insulating resin has a shape with a concave portion in the center, a groove is formed in a center of the surface of the electric insulating resin, a side surface of said case has a hole formed at lower position than a bottom of said concave portion, and said groove is formed continuously from said concave portion toward said hole, wherein water depositing on the electric insulating resin may be removed outside of said case.

12. A capacitor enhanced in mechanical strength and electric insulation comprising:

a case having an opening, a capacitor element disposed in said case having a terminal, an electric insulating resin disposed in said opening of said case to cover said capacitor element, a wire connected to said terminal, and reinforcing means disposed at a junction for connecting said terminal and said wire, said reinforcing means extending from said case to said wire.

13. A capacitor of claim 12, wherein said reinforcing means has an insulating cover disposed to cover said junction and a surface of said electric insulating resin.

14. A capacitor of claim 13, wherein said insulating cover has a hole, and said wire penetrates through said hole.

15. A capacitor of claim 13, wherein said insulating cover is a plastic molded piece having a bending strength of about 400 kg/cm$^2$ or more.

16. A capacitor of claim 15, wherein said plastic molded piece is formed of at least one material selected from the group consisting of polypropylene, polyethylene terephthalate and nylon, and the plastic molded piece has a thermal deformation temperature of about 100° C. or more.

17. A capacitor of claim 13, wherein said reinforcing means has a heat shrink tube disposed to cover said junction and the surface of said electric insulating resin.

18. A capacitor of claim 17, wherein said heat shrink tube has an inside diameter shrinkage rate of about 60% or more and a thickness after shrinkage of about 0.8 mm or more.

19. A capacitor of claim 12, wherein said reinforcing means has an insulating cover disposed to cover said junction and a surface of said electric insulating resin, and a filler for filling the gap formed between said insulating cover and the surface of said electric insulating resin.

20. A capacitor of claim 19, wherein said filler includes a thermosetting resin.

21. A capacitor of claim 19, wherein said filler is at least one rubber material selected from the group consisting of silicone resin, synthetic rubber, and natural rubber.

22. A capacitor of claim 12, wherein said reinforcing means has a heat shrink tube disposed to cover said junction.

23. A capacitor of claim 12, wherein said reinforcing means has a heat shrink tube disposed to cover said junction, and a filler disposed on the surface of said electric insulating resin to cover a lower end of said heat shrink tube.

24. A capacitor of claim 12, wherein said electric insulating resin has a convex-shape surface having an inclination toward said case from a center of the convex-shape surface, and said electric insulating resin is formed so as to remove water depositing on said electric insulating resin outside of said case.

25. A capacitor of claim 24, wherein said filler is at least one material selected from the group consisting of epoxy resin, urethane resin, silicone resin, synthetic rubber, and natural rubber.

26. A capacitor of claim 12, wherein said electric insulating resin has a groove formed in a surface thereof, and said groove is formed so as to be capable of removing water depositing on the electric insulating resin outside of the case.

27. The capacitor of claim 12, wherein said reinforcing means has a function for protecting said junction from at least one selected from the group consisting of folding, mechanical stress and vibration.

28. The capacitor of claim 12, wherein said reinforcing means has a tube and a further insulating resin, said tube is disposed to cover said junction, and said further insulating resin is filled in a gap inside said tube.

* * * * *